Patented May 20, 1952

2,597,753

UNITED STATES PATENT OFFICE 2,597,753

PRODUCTION OF NITROPARAFFINS

Fred W. Schmitz and Richard S. Egly, Terre Haute, Ind., assignors to Commercial Solvents Corporation, Terre Haute, Ind., a corporation of Maryland No Drawing. Application April 20, 1950, Serial No. 157,178

21 Claims. (Cl. 260—644)

This invention relates to the recovery of nitroparaffins and more particularly relates to the purification and stabilization of nitroparaffins.

It has been found that nitroparaffins, produced by the direct vapor phase nitration of hydrocarbons, may contain considerable amounts of color forming bodies which make it difficult to produce water-white derivatives of nitroparaffins and also discolor the nitroparaffins themselves. Particular attention has been directed to the removal of immediate color producing bodies but still there has remained the problem of removing latent color forming bodies which impart color to the nitroparaffins on standing for considerable periods of time. This condition has resulted in sales resistance on the part of consumers and a general apathetic attitude toward the distinct advantages offered by the use of nitroparaffins where applicable. It has also resulted in the use of expensive lined containers and containers made from special alloys in which to store the nitroparaffins in an attempt to eliminate the formation of undesirable color.

We have now discovered that certain chemical reagents when used as a wash for the nitroparaffin compounds have the property not only of improving the immediate color characteristics of the nitroparaffins but also have the property of improving the color which the nitroparaffin has after a considerable period of storage. Furthermore, such storage can be in ordinary steel drums without fear of corrosion difficulties and corrosion-induced color since the corrosion and acidity characteristics of the nitroparaffins are considerably improved by the treatment comprising our invention.

In carrying out our invention, we treat the nitroparaffins with an aqueous solution of a reagent which has the characteristic of removing the color-forming materials present in the nitroparaffins. Suitable reagents for use in our process include alkali metal bicarbonates, alkali metal bisulfites, hydrogen peroxide, alkali metal dichromates, etc., and combinations thereof, wherein the same lot of nitroparaffin material is treated with more than one of the color removing reagents in consecutive wash treatments, except that alkali metal dichromate and hydrogen peroxide treatments cannot be followed by an alkali metal bisulfite treatment, but must be followed by an alkaline treatment such as by an alkali metal bicarbonate. The particular reagent to be used for optimum results depends on the nitroparaffin being treated when the process is used after the individual nitroparaffins have been isolated.

Our process is also effective when it is used before isolation of the individual nitroparaffins. The crude mixture of nitroparaffins from which the low boiling components have been stripped is treated with a chemical reagent which has the property of removing color forming bodies before the crude mixture is fractionated to recover the individual nitroparaffins. This treated product is fairly stable in the crude form and can be used as such. However, it is usually desirable to fractionate the treated product and recover the individual nitroparaffins which retain the non color-forming properties imparted to the crude material by the treatment.

As has been stated above, the reagent to be used for best results is dependent upon which nitroparaffin is treated. For example, when nitromethane or nitroethane is treated, we have found that a combination of an alkali metal bicarbonate wash followed by an alkali metal bisulfite wash stabilizes the nitromethane and nitroethane and improves their corrosion characteristics better than any other reagent or combination of reagents. On the other hand when 1-nitropropane is treated, we have found that a sodium bisulfite wash alone gives best results. In the case where the stripped crude mixture of nitroparaffins is treated before it is fractionated to recover the individual nitroparaffins, an alkali metal bicarbonate wash followed by an alkali metal bisulfite wash gives excellent results. Combinations of alkali metal dichromate wash followed by an alkali metal bicarbonate wash and of a hydrogen peroxide wash followed by an alkali metal bicarbonate wash give good results in all cases.

In carrying out our invention, we can use concentrations of the wash reagents ranging from approximately 1% to 15%. In the case of alkali metal bicarbonate and alkali metal bisulfite wash solutions, we can use concentrations ranging from 1% up to and including saturated solutions, however, we prefer to use 5% solutions of these two reagents. When alkali metal dichromate wash solutions are used we also prefer a 5% solution but for hydrogen peroxide, a 2% solution is preferred. We prefer to use the wash solution in a 1 to 1 volume ratio to the nitroparaffin to be treated. However, volume ratios from 1 to 1 down to and including 1 to 5 ratios of wash to nitroparaffin are operative in our process.

In using the alkali metal bicarbonate—alkali metal bisulfite double wash for nitromethane or nitroethane, the importance of using the sodium bicarbonate first must be emphasized. The nitromethane and nitroethane fractions contain much more acid than any of the other nitroparaffins so that when an alkali metal bisulfite is used first, the acid reacts with the bisulfite to liberate sulphurous acid and the material when stored becomes very dark in color and is very corrosive to steel. The liberated sulphur is not easily removed and a subsequent wash with an alkali metal bicarbonate still leaves a product that colors badly during storage in steel drums. When an alkali metal bicarbonate is used first, the acid in the nitroparaffin is neutralized and thus when the alkali metal bisulfite wash is subsequently used, it is not decomposed as in the other case. The double wash does not exclude the variation wherein we mix the alkali metal bicarbonate and the alkali metal bisulfite together and use the mixture in a single wash treatment and we have found that such a wash has a substantial stabilizing effect on the nitroparaffins such as that given by the double wash. For treating nitroparaffins higher than nitroethane in the homologous series, alkali metal bisulfite washes can be used alone very satisfactorily.

Alkali metal dichromates, being oxidizing agents, are best used in acid solution such as for example 0.05 to 2.0 normal sulfuric acid solution. This releases the oxidizing components of the alkali metal dichromate and increases the efficiency of the wash. Hydrogen peroxide is also an oxidizing agent but it is active without having to be used in acid solution. The use of ion exchange resins and activated carbon as adsorptive agents has been found to supplement the effect of our process. In particular, the immediate color of the nitroparaffin treated is improved by the use of these agents.

Distillation operations conducted on the nitroparaffin after being washed according to our process insure the purest possible compound and eliminate the possibility of corrosion from undesirable materials such as water, acids, etc. It is usually necessary to distill the washed nitroparaffins in order to dry them but further fractionation of the already separated nitroparaffins is not essential when our process is employed.

The process of our invention is carried out by vigorously mixing the nitroparaffin with the wash solution by agitating the mixture or by using a continuous countercurrent flow system. After the nitroparaffin and the wash solution have been mixed, the mixture is allowed to stand until it forms into layers. The nitroparaffin layer is then separated and dried by distilling out the water in the water-nitroparaffin azeotrope. Further distillation, fractionation, and treatment with adsorptive carbon and ion exchange resins can then be carried out if desired.

The following examples are offered to illustrate our invention and are not to be considered as limiting it in any way, all obvious equivalents being considered as within the scope of the invention as disclosed in the specification and appended claims.

EXAMPLE I

A 500 ml. portion of nitromethane was washed with an equal volume of an aqueous 5% solution of sodium bicarbonate by shaking the solutions vigorously for about 30 minutes in a two liter cone type separatory funnel. The funnel was then allowed to stand for about 20 minutes to allow the nitromethane and wash layers to settle. The wash layer was discarded and the nitromethane again washed with an equal volume of an aqueous 5% solution of sodium bisulfite. The layers were allowed to settle and the nitromethane layer was then separated and distilled to remove the water in the water-nitroparaffin azeotrope. Approximately 150 ml. of the washed nitromethane was put in a Pyrex test tube of 170 ml. capacity and a mild carbon steel strip, 4½ inches x ½ inch x 1/32 inch, buffed to a bright surface placed in the tube. The tube was tightly stoppered and then placed in a rack covered on all sides by opaque paper to exclude light rays. Color measurements were taken at the end of 3 months, one and two years and the acidity and weight of the strip were taken at the start and end of the tests. The results are shown in the following table along with the results of a storage test of a sample of untreated nitromethane.

Table I
WASHED NITROMETHANE

|  | Initial | 3 mos. | 1 yr. | 2 yrs. |
|---|---|---|---|---|
| Weight of Strip—gms. | 8.1410 | | | 8.1426 |
| Acidity—per cent | .01 | | | .008 |
| Color—Lovibond Scale | .3Y.1B | | 1.0Y.5R | .7Y.1R |

UNWASHED NITROMETHANE

|  | Initial | 3 mos. | 1 yr. | 2 yrs. |
|---|---|---|---|---|
| Weight of Strip—gms. | 8.2095 | | | 8.1675 |
| Acidity—per cent | 1.2 | | | 1.21 |
| Color—Lovibond Scale | .7Y.1B | 3.0Y1.2R | 20.0Y9.0R | 20.0Y9.9R |

EXAMPLE II

A 500 ml. portion of nitromethane was washed with an equal portion of a 2% aqueous solution of hydrogen peroxide and then subsequently washed with a 5% aqueous solution of sodium bicarbonate in the manner of Example I. The results are shown in Table II.

Table II

|  | Initial | 3 mos. | 1 yr. | 2 yrs. |
|---|---|---|---|---|
| Weight of Strip—gms. | 8.0076 | | | 8.0046 |
| Acidity—per cent | .01 | | | .004 |
| Color—Lovibond Scale | .8Y | | 1.1Y.1R | 1.1Y.1R |

EXAMPLE III

A 500 ml. portion of nitromethane was washed with an equal portion of a 5% aqueous solution of sodium dichromate in 0.1 N sulfuric acid and then subsequently washed with a 5% aqueous solution of sodium bicarbonate in the manner of Example I. The nitromethane was then distilled and treated with activated carbon (1% by weight). The nitromethane was stored as in Example I with the results being shown in Table III.

Table III

|  | Initial | 3 mos. | 1 yr. | 2 yrs. |
|---|---|---|---|---|
| Weight of Strip—gms. | 8.1710 | | | 8.1660 |
| Acidity—per cent | .006 | | | .004 |
| Color—Lovibond Scale | .7Y.4R.8B | .1Y | .6Y.2R | .7Y.1R |

EXAMPLE IV

A 500 ml. portion of nitromethane was washed with a 5% aqueous sodium bicarbonate solution as in Example I. The washed nitromethane was distilled, treated with activated carbon (1% by weight), and then stored as in Example I. The results of the test are shown in Table IV.

Table IV

|  | Initial | 3 mos. | 1 yr. | 2 yrs. |
|---|---|---|---|---|
| Weight of Strip—gms. | 8.2078 | | | 8.2047 |
| Acidity—per cent | .006 | | | .01 |
| Color—Lovibond Scale | .3Y.1R.4B | .4Y | 1.0Y.4R | 1.0Y.1R |

EXAMPLE V

A 500 ml. portion of nitropropane was washed with a 5% aqueous solution of sodium bisulfite in the manner of Example I. The washed nitropropane was distilled and then stored in the manner of Example I. The results are shown in Table V. An unwashed sample of the same nitropropane was stored in a like manner and the results are also shown in Table V.

Table V
WASHED NITROPROPANE

|  | Initial | 3 mos. | 1 yr. | 2 yrs. |
|---|---|---|---|---|
| Weight of Strip—gms. | 8.0671 | | | 8.0660 |
| Acidity—Percent | .01 | | | .02 |
| Color—Lovibond Scale | .3Y.1B | .3Y | .6Y.2R | .6Y |

UNWASHED NITROPROPANE

|  | Initial | 3 mos. | 1 yr. | 2 yrs. |
|---|---|---|---|---|
| Weight of Strip—gms. | 8.0516 | | | 8.0480 |
| Acidity—Percent | .25 | | | .25 |
| Color—Lovibond Scale | 1.5Y | 1.5Y | 20.0Y3.0R | 20.0Y5.0R |

EXAMPLE VI

A 500 ml. portion of nitropropane was washed with a 5% aqueous solution of sodium bisulfite and then subsequently washed with a 5% aqueous solution of sodium bicarbonate as in Example I. The results are shown in Table VI.

Table VI

|  | Initial | 3 mos. | 1 yr. | 2 yrs. |
|---|---|---|---|---|
| Weight of Strip—gms. | 7.9845 | | | 7.9846 |
| Acidity—Percent | .02 | | | .003 |
| Color—Lovibond Scale | .4Y.1B | .6Y | 1.0Y.2R | .9Y.1R |

EXAMPLE VII

A 500 ml. portion of nitropropane was washed with a 5% solution of sodium dichromate in 0.1 normal sulfuric acid and then subsequently washed with a 5% aqueous solution of sodium bicarbonate as in Example I. The results are shown in Table VII.

Table VII

|  | Initial | 3 mos. | 1 yr. | 2 yrs. |
|---|---|---|---|---|
| Weight of Strip—gms. | 8.1602 | | | 8.1599 |
| Acidity—Percent | .01 | | | .009 |
| Color—Lovibond Scale | .5Y.1B | .5Y | 1.1Y.3R | 1.2Y.1R |

EXAMPLE VIII

A 500 ml. portion of stripped crude mixed nitroparaffins was washed with a 5% aqueous solution of sodium bicarbonate and then subsequently washed with a 1% aqueous sodium bisulfite solution as in Example I. The washed crude mixed nitroparaffins were then stored for 16 months in the manner of Example I. The results are shown in Table VIII along with the results of a storage test of a sample of unwashed nitroparaffins.

Table VIII
WASHED NITROPARAFFINS

|  | Initial | 8 mos. | 16 mos. |
|---|---|---|---|
| Weight of Strip—gms. | 8.0575 | | 8.0563 |
| Acidity—Percent | .05 | | .05 |
| Color—Lovibond Scale | .3Y.1B | 1.0Y.3R | 3.0Y.3R |

UNWASHED NITROPARAFFINS

|  | Initial | 8 mos. | 16 mos. |
|---|---|---|---|
| Weight of Strip—gms. | 8.2108 | | 8.2025 |
| Acidity—Percent | .44 | | .18 |
| Color—Lovibond Scale | 1.0Y0.9B | 7.0Y0.9R | 20.0Y4.0R |

What we claim is:

1. In a process for the recovery of nitroparaffins by fractionation of crude mixtures of nitroparaffins, the improvement which comprises washing the nitroparaffins with an aqueous solution of a compound selected from the group consisting of alkali metal bicarbonates, alkali metal dichromates, hydrogen peroxide, alkali metal bisulfites, and an alkali metal bicarbonate-alkali metal bisulfite mixture, said bisulphites being used alone only with nitroparaffins containing more than two carbon atoms, followed by a second washing of the nitroparaffins with an aqueous solution of an alkali metal bicarbonate when a compound selected from the group consisting of alkali metal dichromates and hydrogen peroxide is used first and an alkali metal bisulfite when an alkali metal bicarbonate is used first.

2. In a process for the recovery of nitroparaffins containing more than 2 carbon atoms, by fractionation of crude mixtures of nitroparaffins the improvement which comprises washing said nitroparaffins containing more than two carbon atoms with an aqueous solution of an alkali metal bisulfite.

3. In a process for the recovery of nitroparaffins by fractionation of crude mixtures of nitroparaffins the improvement which comprises washing the fractionated products with an aqueous solution of sodium bicarbonate followed by washing said fractionated products with an aqueous solution of sodium bisulfite.

4. In a process for the recovery of nitroparaffins by fractionation of crude mixtures of nitroparaffins, the improvement which comprises washing the crude stripped mixture before fractionation with an aqueous solution of sodium bicarbonate followed by washing said crude stripped mixture with an aqueous solution of sodium bisulfite.

5. In a process for the recovery of nitroparaffins by fractionation of crude mixtures of nitroparaffins, the improvement which comprises washing the fractionated products with an aqueous solution of a compound selected from the group consisting of sodium dichromate and hydrogen peroxide followed by washing said fractionated products with an aqueous solution of sodium bicarbonate.

6. In a process for the recovery of nitroparaffins by fractionation of crude mixtures of nitroparaffins, the improvement which comprises washing the nitroparaffins with an aqueous mixture of an alkali metal bicarbonate and an alkali metal bisulfite.

7. In a process for the recovery of nitromethane by fractionation of crude mixtures of nitroparaffins, the improvement which comprises washing said fractionated nitromethane with an aqueous solution of sodium bicarbonate.

8. In a process for the recovery of nitropropane by fractionation of crude mixtures of nitroparaffins, the improvement which comprises washing said fractionated nitropropane with an aqueous solution of sodium bisulfite.

9. In a process for the recovery of nitroparaffins by fractionation of crude mixtures of nitroparaffins, the improvement which comprises washing the fractionated products with an aqueous solution containing from 1% to a saturation amount of sodium bicarbonate followed by washing said fractionated products with an aqueous solution containing from 1% to a saturation amount of sodium bisulfite.

10. In a process for the recovery of nitroparaffins by fractionation of crude stripped mixtures of nitroparaffins, the improvement which comprises washing the crude stripped mixture before fractionation with an aqueous solution containing from 1% to a saturation amount of sodium bicarbonate followed by washing said fractionated products with an aqueous solution containing from 1% to a saturation amount of sodium bisulfite.

11. In a process for the recovery of nitroparaffins by fractionation of crude stripped mixtures of nitroparaffins, the improvement which comprises washing the fractionated products with a solution of from 1% to 15% sodium dichromate in from 0.05 to 2.0 normal sulfuric acid followed by washing said fractionated products with an aqueous solution containing from 1% to a saturation amount of sodium bicarbonate.

12. In a process for the recovery of nitroparaffins by fractionation of crude stripped mixtures of nitroparaffins the improvement which comprises washing the fractionated products with an aqueous solution of from 1% to 15% hydrogen peroxide followed by washing said fractionated products with an aqueous solution containing from 1% to a saturation amount of sodium bicarbonate.

13. In a process for the recovery of nitromethane by fractionation of crude stripped mixtures of nitroparaffins, the improvement which comprises washing said fractionated nitromethane with an aqueous solution containing from 1% to a saturation amount of sodium bicarbonate.

14. In a process for the recovery of nitropropane by fractionation of crude stripped mixture of nitroparaffins, the improvement which comprises washing said fractionated nitropropane with an aqueous solution containing from 1% to a saturation amount of sodium bisulfite.

15. In a process for the recovery of nitroparaffins by fractionation of crude mixtures of nitroparaffins, the improvement which comprises washing the fractionated products with a 5% aqueous solution of sodium bicarbonate followed by washing said fractionated products with a 5% aqueous solution of sodium bisulfite.

16. In a process for the recovery of nitroparaffins by fractionation of crude stripped mixtures of nitroparaffins the improvement which comprises washing the crude stripped mixture before fractionation with a 5% aqueous solution of sodium bicarbonate followed by washing said crude stripped mixture with a 5% aqueous solution of sodium bisulfite.

17. In a process for the recovery of nitroparaffins by fractionation of crude stripped mixtures of nitroparaffins, the improvement which comprises washing the fractionated products with a 5% sodium dichromate solution in 0.1 normal sulfuric acid followed by washing said fractionated products with a 5% aqueous sodium bicarbonate solution.

18. In a process for the recovery of nitroparaffins by fractionation of crude stripped mixtures of nitroparaffins, the improvements which comprises washing the fractionated products with a 2% aqueous solution of hydrogen peroxide followed by washing said fractionated products with a 5% aqueous sodium bicarbonate solution.

19. In a process for the recovery of nitromethane by fractionation of crude stripped mixtures of nitroparaffins, the improvement which comprises washing said fractionated nitromethane with a 5% aqueous solution of sodium bicarbonate.

20. In a process for the recovery of nitropropane by fractionation of crude stripped mixtures of nitroparaffins the improvement which comprises washing said fractionated nitropropane with a 5% aqueous solution of sodium bisulfite.

21. In a process for the recovery of nitroparaffins by fractionation of crude mixtures of nitroparaffins the improvement which comprises washing the nitroparaffins with an aqueous mixture of sodium bicarbonate and sodium bisulfite.

FRED W. SCHMITZ.
RICHARD S. EGLY.

REFERENCES CITED

The following references are of record in the file of this patent:

UNITED STATES PATENTS

| Number | Name | Date |
|---|---|---|
| 1,305,790 | Forrest et al. | June 3, 1919 |
| 2,511,433 | Fiala | June 13, 1950 |